United States Patent [19]

Sawada et al.

[11] 4,443,288

[45] Apr. 17, 1984

[54] METHOD AND APPARATUS FOR FUSING TOGETHER THERMOPLASTIC SYNTHETIC RESIN MOLDED ARTICLES

[75] Inventors: Susumu Sawada, Machida; Yoshikazu Yoshida, Koganei; Minoru Tanaka, Kawasaki, all of Japan

[73] Assignee: Mitsubishi Kasei Kogyo Kabushiki Kaisha, Tokyo, Japan

[21] Appl. No.: 410,582

[22] Filed: Aug. 23, 1982

[30] Foreign Application Priority Data

Aug. 26, 1981 [JP] Japan ................................ 56-133842

[51] Int. Cl.³ ............................................. B29C 19/00
[52] U.S. Cl. .............................. 156/304.6; 156/304.1; 156/304.2; 156/309.6; 156/322; 156/499; 156/556; 156/580; 156/583.1; 156/583.3
[58] Field of Search ............... 156/304.1, 304.2, 304.6, 156/309.6, 309.1, 322, 499, 539, 556, 580, 583.1, 583.3, 583.91, 212

[56] References Cited

U.S. PATENT DOCUMENTS

| | | | |
|---|---|---|---|
| 4,032,387 | 6/1977 | Sugiyama et al. | 156/583.3 |
| 4,243,456 | 1/1981 | Cesano | 156/212 |
| 4,310,376 | 1/1982 | Ebina et al. | 156/499 |

Primary Examiner—Edward C. Kimlin
Assistant Examiner—Timothy W. Heitbrink
Attorney, Agent, or Firm—Oblon, Fisher, Spivak, McClelland & Maier

[57] ABSTRACT

In a method and apparatus for fusing together thermoplastic synthetic resin molded articles wherein opposing ends of the molded articles are melted and then fused together under pressure, gaps are formed between holding mechanisms holding respective molded articles and moving mechanisms for moving the molded articles away from a heating plate so as to apply a percussive force upon the holding mechanisms by the movement of the moving mechanisms.

14 Claims, 17 Drawing Figures

METHOD AND APPARATUS FOR FUSING TOGETHER THERMOPLASTIC SYNTHETIC RESIN MOLDED ARTICLES

BACKGROUND OF THE INVENTION

This invention relates to a method and apparatus for fusing together thermoplastic synthetic resin molded articles, and more particularly a method and apparatus for fusing together thermoplastic synthetic resin molded articles wherein the molded articles are urged against a heating plate to melt their surfaces and the molten surfaces are fused together.

It has been known to obtain a desired product, for example a pallet, by fusing together a plurality of synthetic resin molded articles formed by an injection molding machine, an extrusion molding machine or the like, and fusing apparatus having various constructions have been used depending upon the type of the product.

The fusing apparatus of this type usually comprises a holding mechanism for holding articles to be fused together in an opposed relation, a reciprocatable heating plate for melting the surfaces of the articles to be fused together and a pair of press boards for abutting under pressure the molten surfaces of the molded articles.

When fusing together thermoplastic synthetic resin molded articles by using such apparatus, it is necessary to uniformly heat and melt the surfaces of the articles. Accordingly, it has been the practice to urge the surfaces of the molded articles to be fused together against a heating plate heated to a uniform temperature, the engaged state is maintained for a suitable interval to form uniformly melted layers of the resin and then the molded articles are separated away from the heating plate.

Since the surfaces of the molded articles in contact with the heating plate are in a molten state when the molding articles are separated away from the heating plate, a portion of the molten resin often remains on the surface of the heating plate.

Upon occurrence of such state, the molten surfaces of the molded articles to be fused together become irregular or a portion of the molten resin layers formed on the surfaces of the molded articles drops off with the result that the fused portions of the resulting product become nonuniform thus decreasing the mechanical strength thereof.

The thermoplastic synthetic resin adhered to the surface of the heating plate tends to degrade. For this reason, the degraded resin accumulated in the preceding operations would adhere to the surfaces of the molded articles to be melted in the later operation. This also causes decrease in the mechanical strength of the product.

To overcome these defects, in the fusing apparatus of the type described above Teflon resin or the like was coated on the surface of the heating plate for preventing the molten resin from adhering thereto.

However, since the durability of the teflon resin or the like is not sufficiently high, it is necessary to apply again the coating in a short time, thus not only increasing the manufacturing and reparing costs of the heating plate but also making it difficult to obtain satisfactory heating plate.

SUMMARY OF THE INVENTION

Accordingly, it is the principal object of this invention to provide an improved method and apparatus for fusing together thermoplastic synthetic resin molded articles capable of obviating various problems described above.

According to one aspect of this invention, there is provided a method of fusing together thermoplastic synthetic resin articles wherein the molded articles to be fused together are held in opposed relation by holding means, a heating plate is inserted into a space between opposed molded articles, the molded articles are urged against the heating plate by moving means to melt confronting surfaces of the molded article, the heating plate is moved out of the space, and then the molded articles are abutted and fused together at molten confronting surfaces, characterized in that the method comprises the steps of forming gaps between the holding means and the moving means before separating the molded articles from the heating plate and applying a percussive force upon the holding means by movements of the moving means so as to quickly separate the molded articles from the heating plate.

According to another aspect of this invention there is provided apparatus for fusing together thermoplastic synthetic resin molded articles of the type comprising a pair of opposed press boards, a pair of holding means provided on opposing sides of the press boards for respectively holding the molded articles, a heating plate, drive means for advancing and retracting the heating plate into and out of a space between the holding means, and moving means for urging against and separating the molded articles away from the heating plate, characterized in that each of the holding means comprises a floating plate mounted on the press board to be movable in the direction of movement thereof and a holding member for securing the molded article to the floating plate and that there is provided spacer means mounted between the floating plate and the heating plate for maintaining a predetermined distance between the floating plates and the heating plate when opposing surfaces of the molded articles are urged against the heating plate to melt the opposing surfaces.

DESCRIPTION OF THE PREFERRED EMBODIMENT

Figure 1:
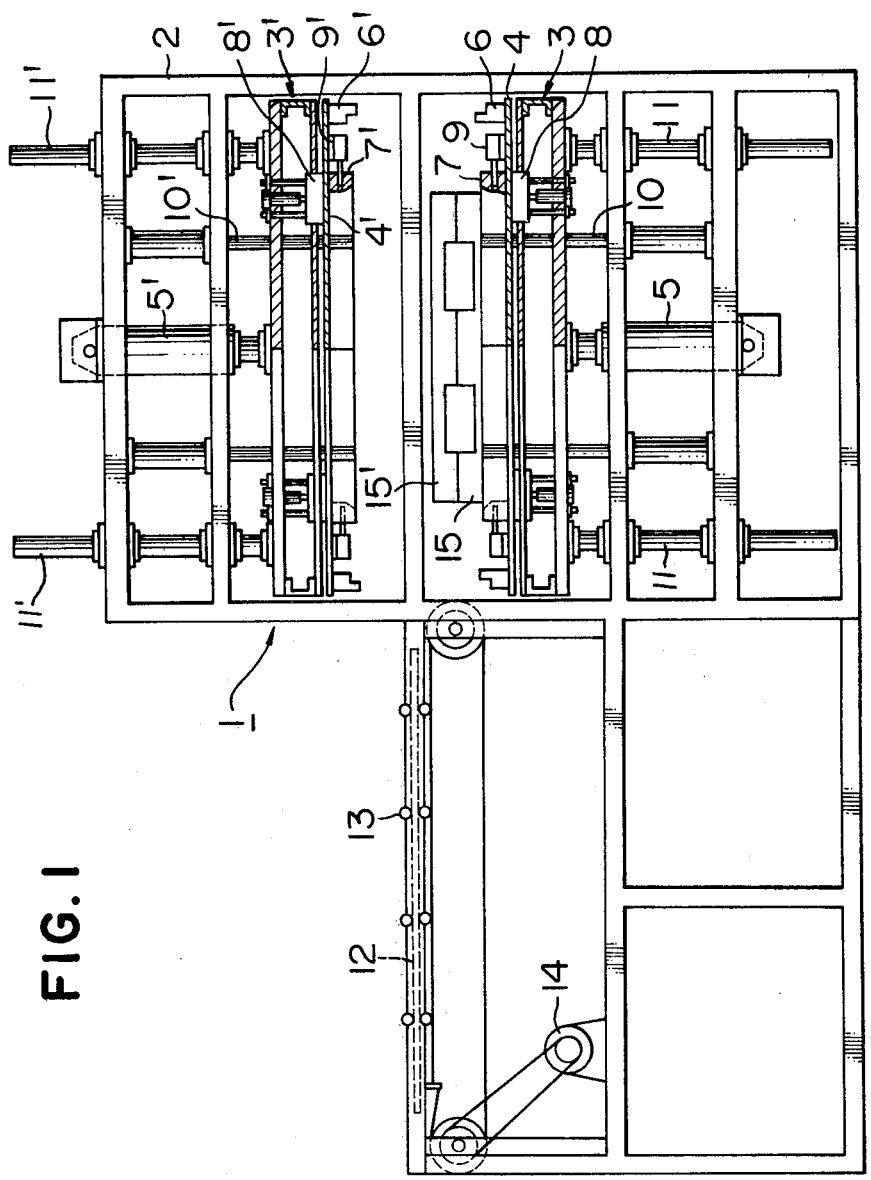
FIG. 1 is a side view, partly in section, showing one embodiment of the fusing apparatus embodying the invention.

The fusing apparatus shown in FIG. 1 comprises a frame 2, a pair of press boards 3 and 3' and a heating plate 12 as its principal elements. The press boards 3 and 3' oppose each other and are moved toward and away from each other in the vertical direction by oil pressure (or pneumatic) cylinders 5 and 5' along guide rods 11 and 11'. The heating plate 12 is reciprocated into a space between the press boards by an electric motor 14 along guide rollers 13.

In the fusing apparatus of this type, thermoplastic synthetic resin molded articles 15 and 15' are mounted on the opposing inner surfaces of the press boards 3 and 3' and then urged against the heating plate 12 so as to abut and fuse together the molded articles.

However, as above described, when the molded articles are separated away from the heating plate 12 after melting their inner surfaces, molten resin tends to remain on the surface of the heating plate.

According to this invention, the moving mechanism including press boards, oil pressure cylinders, etc., and the holding mechanisms for securely holding the thermoplastic synthetic resin molded articles 15 and 15' on the press boards are constructed to have special constructions.

More particularly, according to this invention, a gap is provided between the moving mechanism and holding mechanism, so that when the moving mechanism is moved in a direction to separate the molded articles 15 and 15' away from the heating plate 12, the holding mechanism would not be moved simultaneously, thus forming a gap between the holding mechanism and the moving mechanism. With this construction, only when the speed of the moving mechanism has reached a desired speed, the moving mechanism percussively moves the holding mechanism with a time delay.

This construction and function will be described as follows with reference to FIGS. 2a through 2h showing successive steps.

Figure 2A:
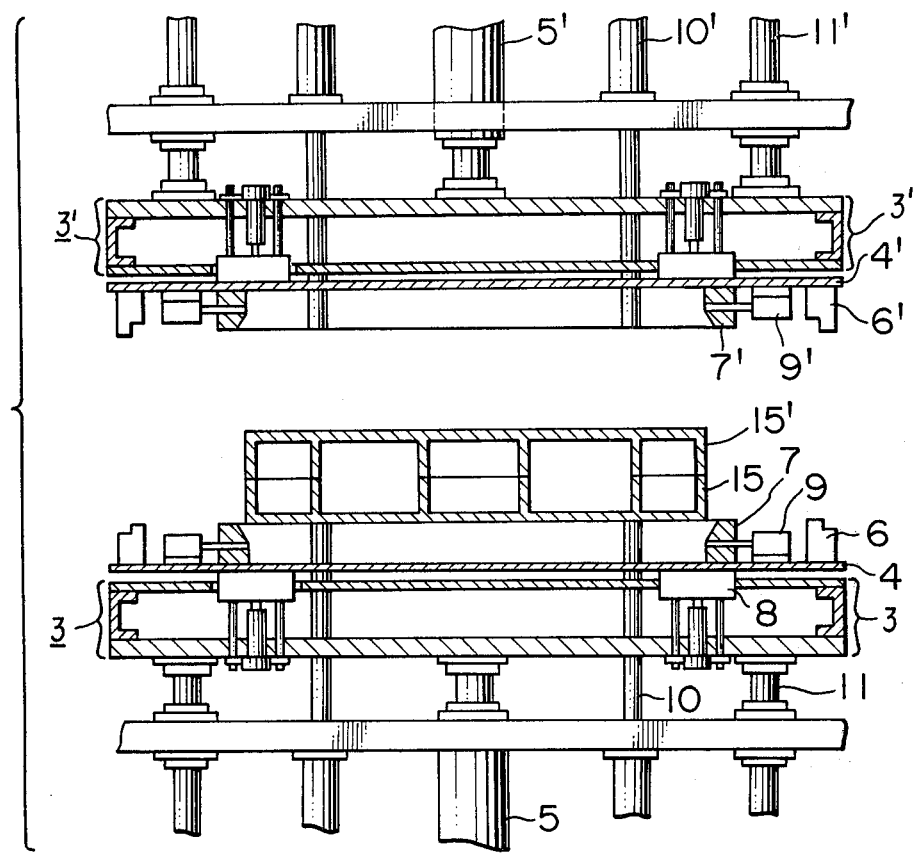
FIG. 2a through FIG. 2h are partial vertical sectional views showing successive steps of fusing together molded articles by using the apparatus shown in FIG. 1.

FIG. 2a shows a state in which the surfaces of the molded articles 15 and 15', are set in the fusing apparatus 1 with their surfaces to be fused together abutting each other. Then the upper and lower press boards 3 and 3' are brought together to a state shown in FIG. 2b.

Figure 2B:
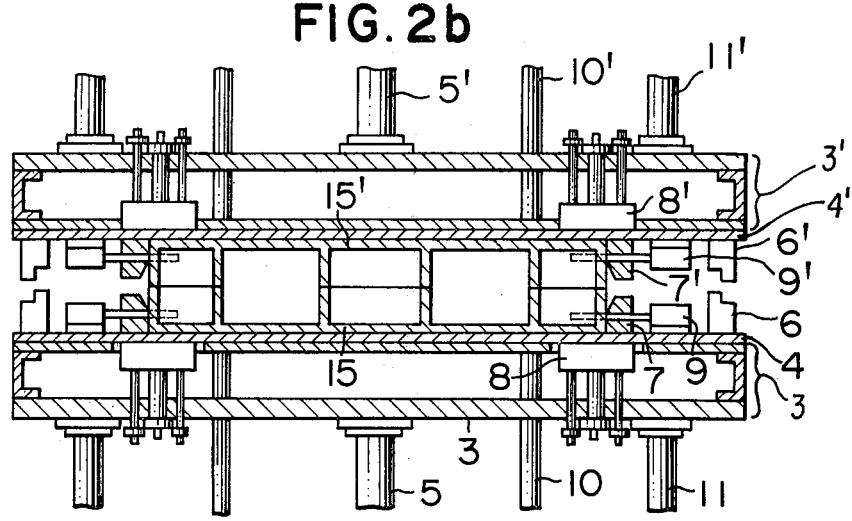

In the state shown in FIG. 2b, base portions of the molded articles 15 and 15' are forced into mold frames 7 and 7' mounted on floating plates 4 and 4' provided on the bottom of press board 3 and top of press board 3' respectively. Anchors 9 and 9' are provided at suitable positions on the outside of the mold frames 7 and 7', and the pins of the anchors 9 and 9' are projected to hold and fix the molded articles. After the molded articles 15 and 15' have been fixed by the holding mechanism including the mold frames 7 and 7', anchors 9 and 9', etc., the press boards 3 and 3' are opened or separated to a state as shown in FIG. 2c.

Figure 2C:
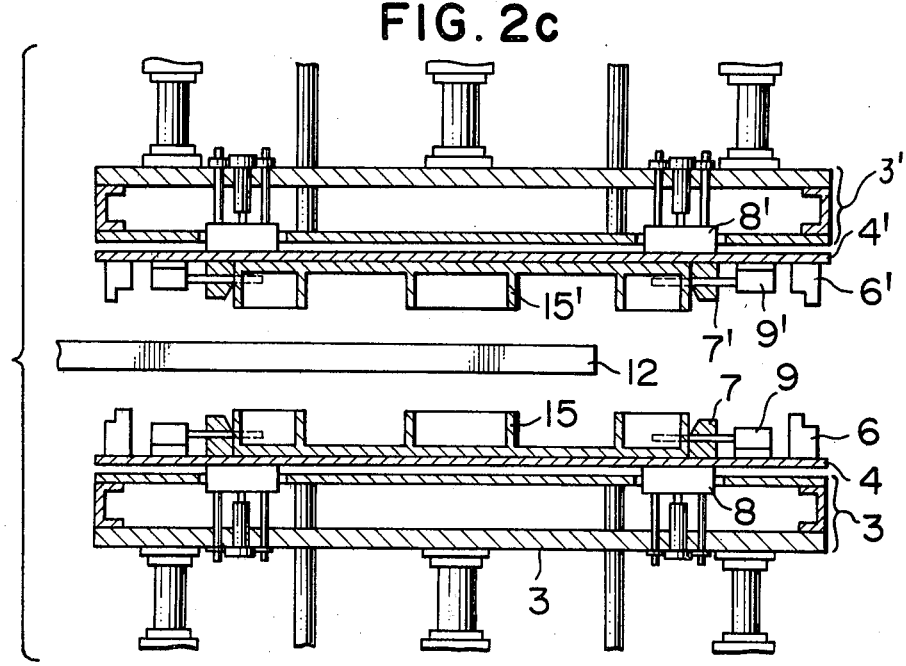

FIG. 2c shows a state in which the heating plate 12 is advancing into a space between the separated press boards 3 and 3'. After the heating plate has completely advanced the press boards 3 and 3' are brought together to urge the molded articles against both sides of the heating plate 12 to melt their opposing surfaces. This state is shown in FIG. 2d.

Figure 2D:
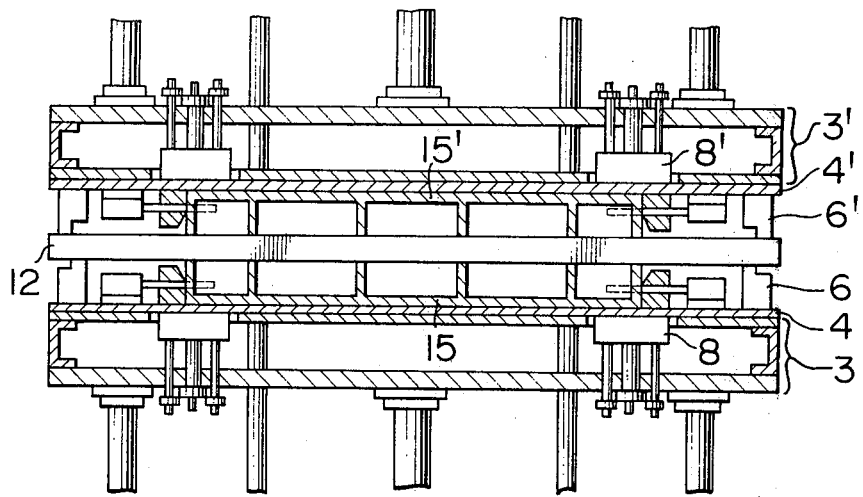

In the state shown in FIG. 2d, the surfaces of the molded articles 15 and 15' are melted by the heating plate 12 and the heights of the articles slightly decrease due to the pressures applied by the press boards. However, as spacers 6 and 6' which determine the spacings between the heating plate 12 and the floating plates 4 and 4' are provided on the outside of the mold frames, the decrease in the heights of the molded articles is stopped at predetermined positions. By maintaining this state for a certain time, layers of molten resin are formed on the surfaces of the molded articles 15 and 15'. These layers of the molten resin are effective for the fusion to be described later.

After heating for a suitable time, the molded articles 15 and 15' are separated away from the heating plate 12 by operating the oil pressure cylinders 5 and 5'. However, if the separation speed is low, the molten resin would adhere to the surface of the heating plate 12, thus causing the problem already described.

The adhesion is governed by various factors. For example, the heating plate is usually provided with a Teflon coating and the factors are influenced by the state of the Teflon coating, the surface temperature of the heating plate, and the thermoplastic resin used. Of course, the tendency of the adhesion is small when the Teflon coating is new, when the temperature of the heating plate is low and when the viscosity of the molten raw material resin is high.

For example, when the melt index MI (which shows a melt viscosity, and lower melt index means a higher melt viscosity) of a high density polyethylene is 0.2, no adhesion occurs even at a low separation speed of 1.7 mm/sec., with a MI of 1.0, a separation speed of 9 mm/sec. results in a large quantity of adhesion, and a separation speed of 15 mm/sec causes an appreciable adhesion. In the case of injection molded articles, a high density polyethylene having a MI of larger than 4 is generally used but where the MI is 4–5, it is necessary to separate the molded articles at a substantially high speed.

We have found that, where a high density polyetylene having a MI of 4–5 is used for a commercial production, a separation speed of 400 mm/sec. and higher is preferable by taking into consideration the influence of other factors. Furthermore, higher separation speeds are advantageous because separation force can be reduced. For instance, where a separation speed of 1.7 mm/sec. is used for a high density polyethylene, a separation force of 286 g/cm$^2$ is necessary but for a separation speed of 170 mm/sec., the separation speed can be reduced to 17 g/cm$^2$.

For the purpose of preventing adhesion of the thermoplastic synthetic resin to the heating plate, according to this invention, the molded articles 15 and 15' are percussively separated from the heating plate, i.e. extremely quickly.

Figure 2E:
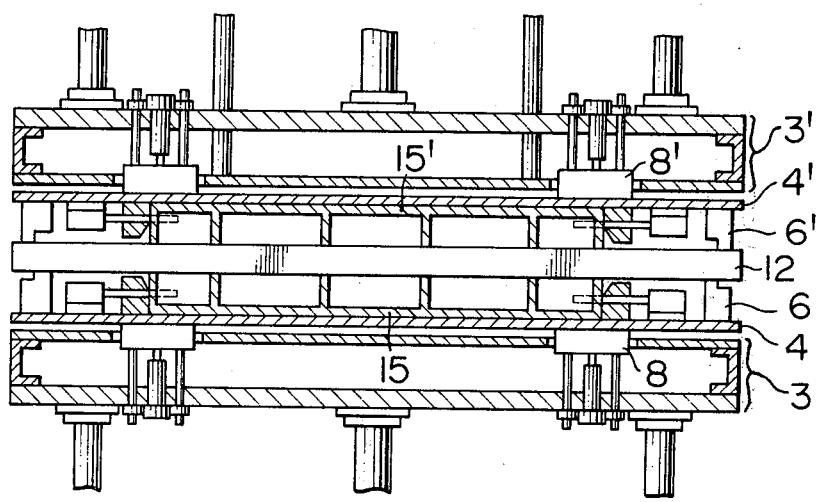

This can be accomplished by the following construction. Thus, the moving mechanism comprising the press boards 3 and 3' and the oil pressure cylinders 5 and 5' begins to operate from a state shown in FIG. 2d. At this time, the holding mechanisms provided for the press boards 3 and 3' and including floating plates 4 and 4' and anchors 9 and 9' do not operate at the same time as the moving mechanisms. As a consequence, gaps will be formed between the moving mechanisms and the holding mechanisms. As shown in FIG. 2e when the moving mechanism reaches a desired speed, i.e. when the moving mechanisms attain an initial speed while they are moved across the gaps, each holding mechanism engages the moving mechanism and begins to be moved percussively. As a consequence, the molded articles 15 and 15' held by the holding mechanisms are percussively separated away from the heating plate that is at an extremely high speed.

As above described, by making different the starting times of the moving mechanisms and the holding mechanisms, the separation is performed percussively. As the moving mechanism, instead of the oil pressure cylinders other suitable mechanisms can be used including gear mechanisms, levers, wedges, cams and springs.

Figure 2F:
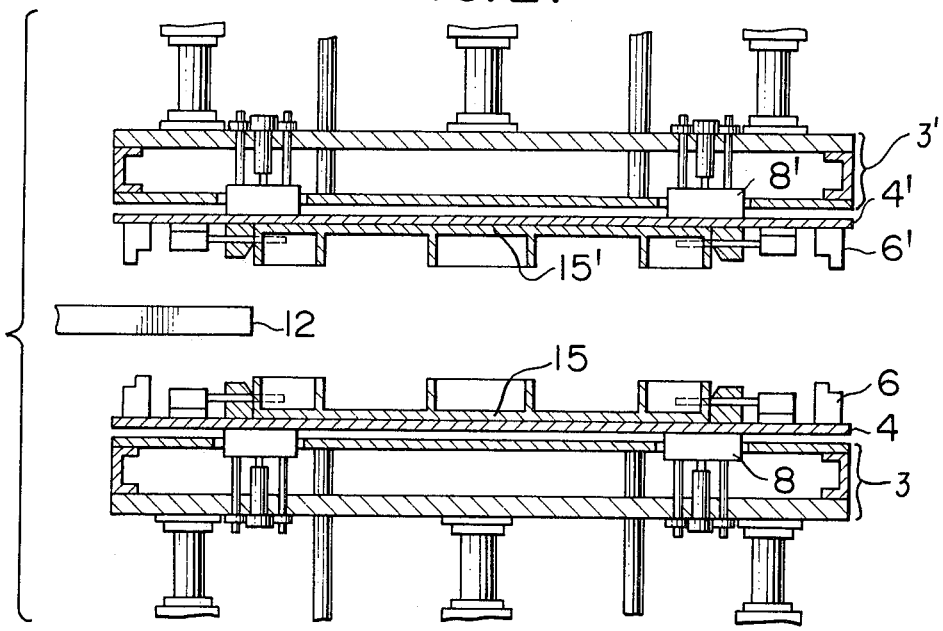
Figure 2G:
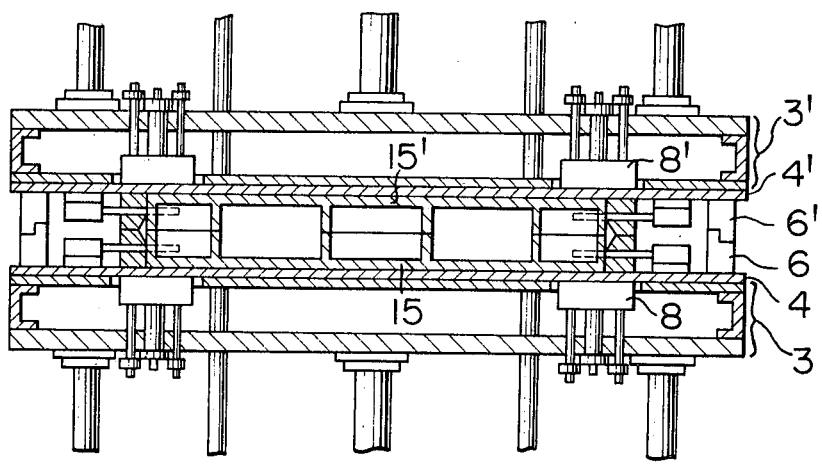

FIG. 2f shows a state in which the heating plate 12 is being drawn out from between the press boards 3 and 3' after completion of the separation. After the heating plate 12 has been completely withdrawn, the press boards 3 and 3' are again brought together to abut and fuse together the molded articles 15 and 15'. This state is shown in FIG. 2g.

The upper surface of each of the spacers 6 and 6' provided on the outside of the molding frames 7 and 7' is stepped. In the state shown in FIG. 2g, these stepped portions of the spacers 6 and 6' are caused to engage with each other by the pressure applied to the press boards, so that the thicknesses or heights of the molded articles 15 and 15' decrease by the heights of the stepped portions. In other words, the height of each stepped portion provides a fusion allowance. This state is maintained until the fused portion solidifies to some extent.

Figure 2H:
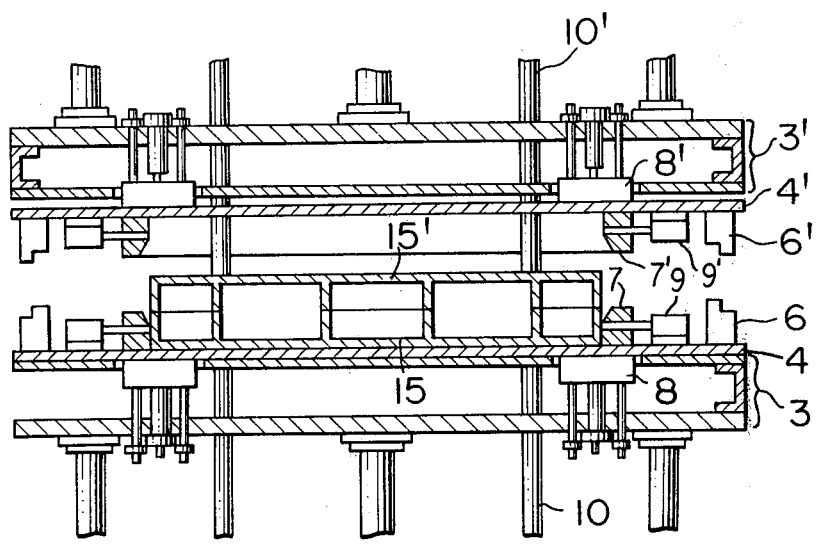

FIG. 2h shows a state of taking out a resulting product. Firstly, pins of the anchors 9 and 9' projected from the mold frames 7 and 7' are retracted. Then the upper press board 3' is moved upwardly with its pins 10' projected downwardly so as to disengage the upper half of the fused molded articles 15 and 15' from the mold frame 7'. Then, the pins 10 of the lower press board 3 are projected upwardly to remove the fused molded articles 15 and 15' from the lower mold frame 7. This state is shown in FIG. 2a.

Figure 3A:
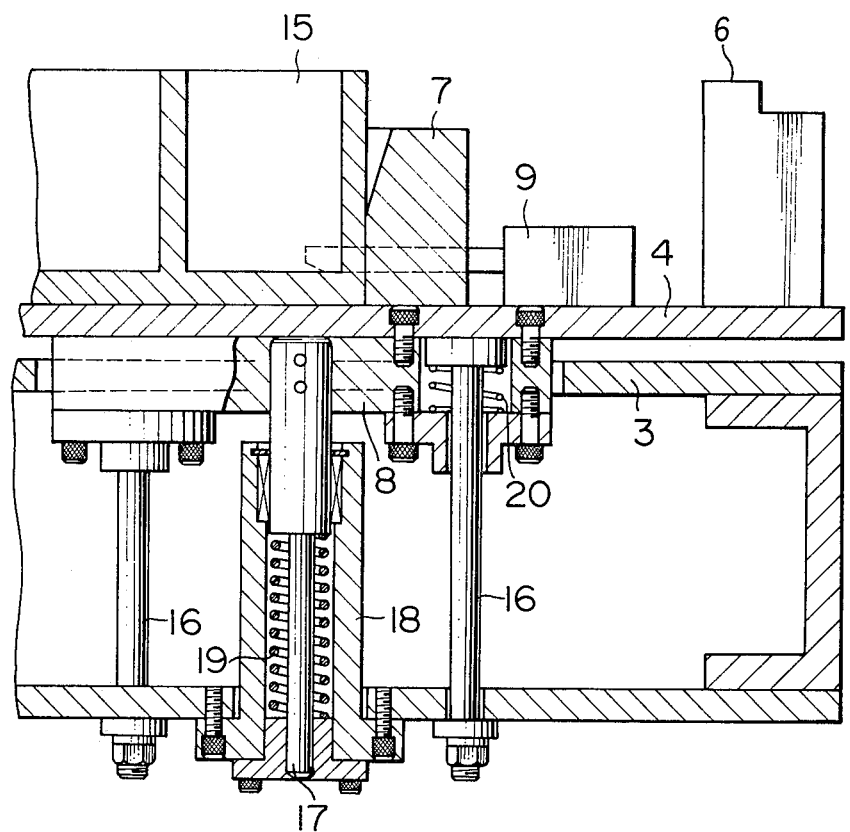
FIGS. 3a, 3b and 3c are partial longitudinal sectional views showing the construction and operation of one example of a holding mechanism and a moving mechanism.
Figure 3B:
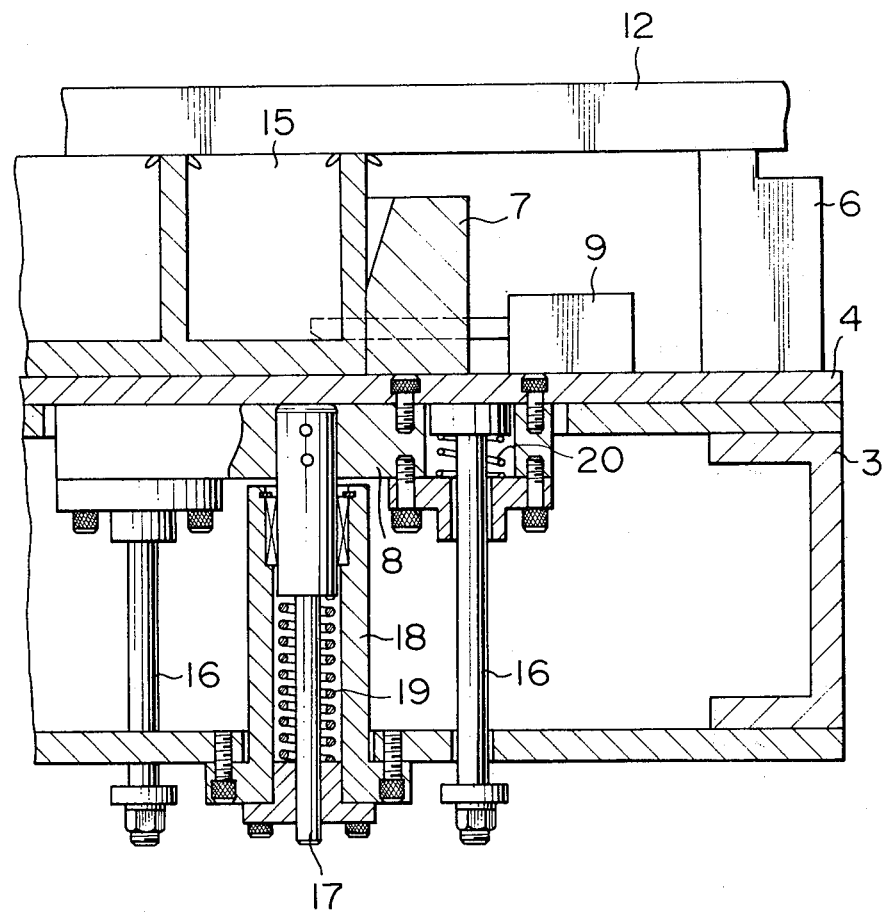
Figure 3C:
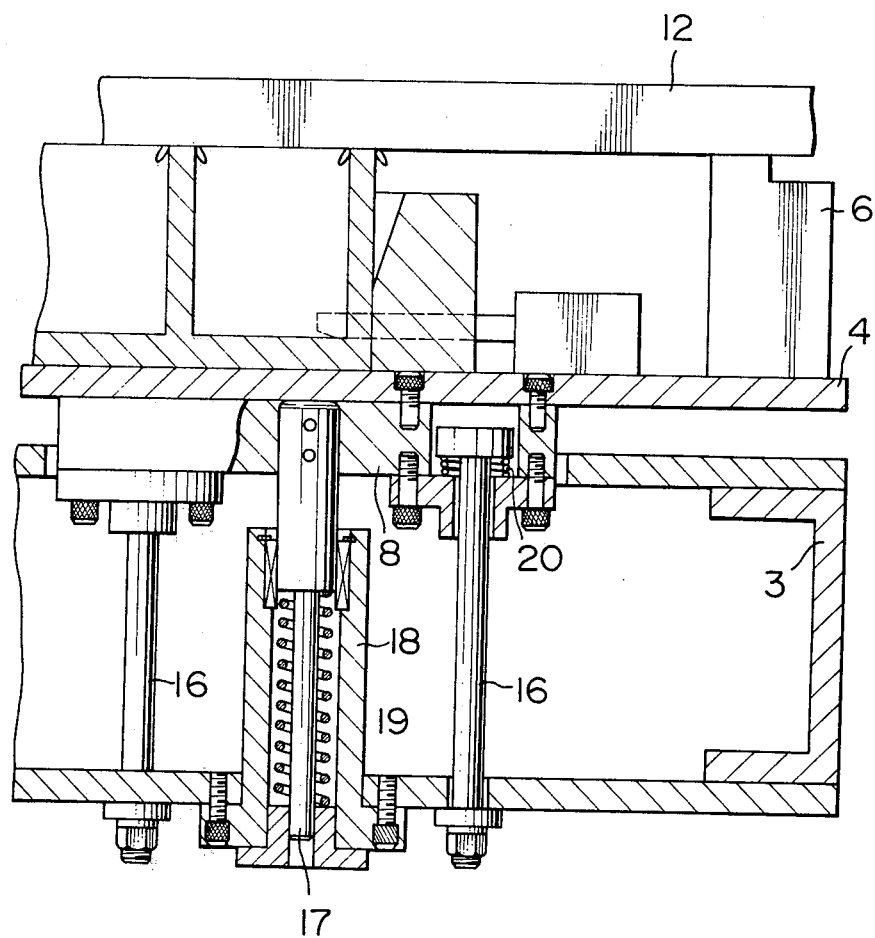

The molded articles 15 and 15' are fused together in a manner as above described. One example of the step of separating the fused molded articles 15 and 15' away from the heating plate, which characterizes the invention, will be described in more detail with reference to FIGS. 3a-3c showing vertical sections of the holding mechanism and the moving mechanism at different steps.

More particularly, as shown in these figures, a vertical supporting cylinder 18 is provided at a suitable position of the press board 3 and a supporting pin 17 and a spring 19 for moving the pin 17 in the vertical direction are contained in the cylinder 18. A supporting member 8 secured to the floating plate 4 is connected to the upper end of the pin 17. Thus, under a normal state shown in FIG. 3a, the floating plate 4 is supported by the spring 19 at a position forming a gap between it and the press board 3. With this construction, however, when a force is applied tending to separate the floating plate 4 away from the press board 3, the floating plate 4 would be disengaged from the press board 3. To prevent this, connecting pins 16 that interconnect the supporting member 8 and the press board 3 are provided on both sides of the supporting pin 17.

However, the connecting pins 16 are not rigidly connected to the support member 8 and the press board 3, but supported by springs 20 to be movable with respect to the supporting member 8. In other words, the floating plate 4 is supported by the connecting pins 16, the supporting member 8, etc. so as to engage and separate from the press board 3.

As the molded article 15 is pressed against the heating plate 12, the gap between the floating plate 4 and the press board 3 decreases to zero. At this time, the spring 19 is compressed and the supporting pin 17 and the connecting pins 16 project beyond the lower surface of the press board 3. This state is shown in FIG. 3b.

Upon completion of the melting of the resin, the molded article 15 is separated away from the heating plate 12. At this time, the press board 3 is firstly moved. Since the floating plate 4 is loosely connected to the press board 3, even when the press board 3 starts to move, the floating plate would not move.

After moving a predetermined distance the press boards 3 comes to engage one ends of the connecting pins 16 projecting beyond the lower surface of the press board 3 to pull down the connecting pins 16. Then, the heads of the connecting pins begin to compress the springs 20. Upon completion of the compression of the springs 20, the connecting pins 16 apply a percussive force to the floating plate 4 via the supporting member 8, whereby the molded article 15 secured to the floating plate is quickly separated away from the heating plate 12. This state just prior to actual separation is shown in FIG. 3c.

As above described, the holding mechanism holding the molded article 15 is moved percussively by the energy of motion of the moving mechanism including the press board 3 but the percussive force is caused to vary by the speed of the moving mechanism. In order to obtain a desired percussive force it is advantageous to select the gap between the press board 3 and the floating plate 4 to be about 0.5–2.5 cm and the speed of the moving mechanism at the time of percussively pulling the supporting member 8 of the floating plate by the press board 3 to be higher than about 300 mm/sec.

The purpose of the springs 20 interposed between the connecting pins 16 and the supporting member 8 is to alleviate the percussive force applied upon the connecting pins. If these springs 20 were too stiff, the percussive force applied to the floating plate 4 from the press board would be alleviated too much, thus weakening the percussive force. For this reason, it is desirable that the springs 20 should be relatively weak.

As above described, the purpose of the spring 19 urging the supporting pin 17 in the supporting cylinder 18 is to form a gap between the floating plate 4 and the press board 3. However, when the molded article 15 engages too quickly against the heating plate 12, the Teflon coating applied thereon would be damaged. The spring 19 also acts to alleviate the shock created at the time of urging the molded article 15 against the heating plate 12, thus preventing the damage of the heating plate. By decreasing the speed of the press board 3 at the time of urging the molded article 15 against the heating plate the damage of the heating plate can be more effectively prevented, thus prolonging its life.

In this manner, the molded article 15 is momentarily separated from the heating plate 12 at a high speed, so that the molten resin on the surface of the molded article will never adhere to the surface of the heating plate.

Figure 4A:
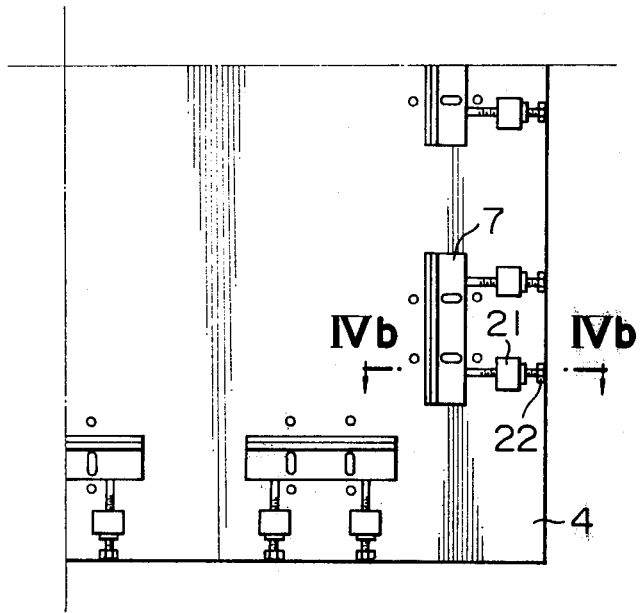
FIG. 4a is a plan view showing modified mold frame.
Figure 4B:
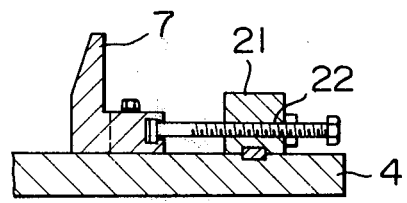
FIG. 4b is a vertical sectional view of the mold frame shown in FIG. 4a taken along a line IVB—IVB.

FIGS. 4a and 4b show another example of the mold frame 7 in which FIG. 4a shows a plan view of one quarter of the floating plate 4, and the mold frame 7 is divided into a plurality of sections. The position of each mold frame section is adjustable by stationary blocks 21 and adjusting bolts 22. Where portions of the upper and lower molded articles to be fused together are offset more or less due to difference in the shrinkage, one or more mold frame sections are adjusted to obtain accurate alignment.

Figure 5A:
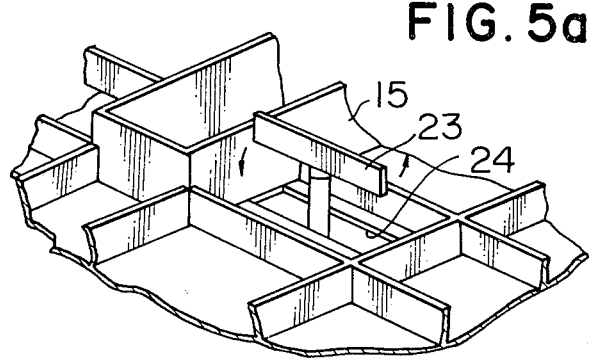
FIGS. 5a, 5b and 5c are perspective views showing a modified anchor at successive states.
Figure 5B:
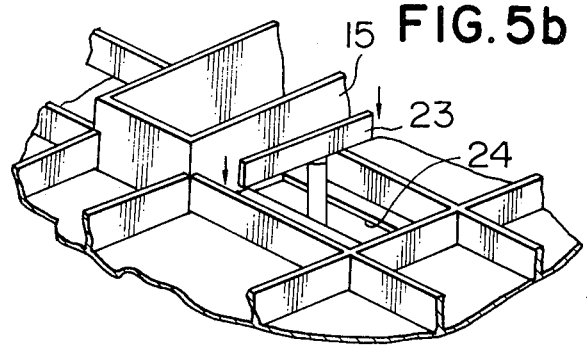
Figure 5C:
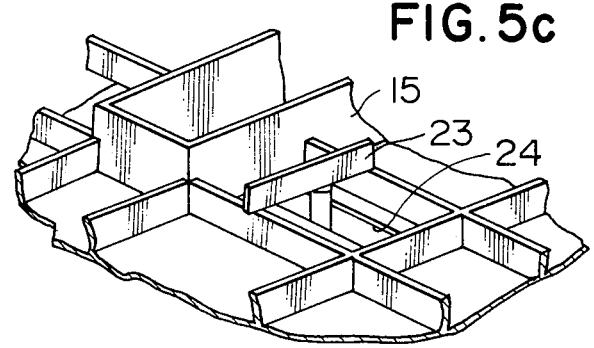

FIGS. 5a, 5b and 5c show another example of the anchor. Where the molded articles 15 and 15' shown in FIGS. 1-3 are used to fabricate a relatively large flat product such as a pallet adapted to convey goods, when press fitting the molded articles into the molding frames 7 and 7', the molded products are usually compressed by the mold frames 7 and 7' from the periphery to slightly shrink. Then, the molded articles tend to bend with their central portions bulged outwardly to separate away from the floating plate 4. When the molded articles are fused together under these states, the central portions of the molded articles would be melted excessively so that the thickness of the central portion of the resulting product would become smaller than that of the periphery. Moreover, as the central portion is not perfectly held by the floating plate 4, the molten resin at this portion does not completely separate from the heating plate and remains on the heating plate 12. The modified anchor 25 shown in FIGS. 5a-5c is designed to overcome this defect. In this modification, a T shaped or hook shaped anchor 23 is inserted through an opening 24 provided for a molded article 15 so as to press it against the floating plate 4.

To use this modified T shaped anchor 23, it is inserted through the elongated or rectangular opening 24 of the molded article 15 as shown in FIG. 5a, rotated by 90° as shown in FIG. 5b and then pulled down to urge the molded article 15 as shown in FIG. 5c. It is advantageous to provide such an anchor at a portion of the molded article 15 which tends to bulge out, that is near the center thereof.

The shape of the anchor 23 is not limited to a letter T shape but may take any other forms, L or J for example. Furthermore, instead of rotating the anchor to the operative position it may be slid laterally to the operative position.

As above described according to this invention when fusing together thermoplastic synthetic resin molded articles after melting their surfaces with a heating plate adhesion of the molten resin to the heating plate can be efficiently prevented so that the thickness of the layers of the molten resins on the surfaces of the molded articles are made uniform, thereby improving the mechanical strength of the fused portion. In addition, there is no fear of damaging a protective coating applied onto the surface of the heating plate, thereby elongating its useful life and eliminating frequent repair thereof.

What is claimed as new and desired to be secured by Letters Patent of the United States is:

1. In a method of fusing together thermoplastic synthetic resin molded articles wherein said molded articles to be fused together are held in spaced opposed relation by holding means, a heating plate normally held at a position on one side of a space between said opposed molded articles is inserted into said space, said molded articles are moved toward said heating plate to be urged thereto by a moving means to melt confronting surfaces of said molded articles, moving said molded articles away from said heating plate with said moving means, retracting, said heating plate out of said space via a drive means, and then said molded articles are abutted and fused together at molten confronting surfaces, the improvement which comprises the steps of supporting said holding means in a manner such that gaps are formed between said holding means and said moving means before separating said molded articles from said heating plate, limiting said gap such that a percussive force is applied to said holding means by movements of said moving means so as to quickly separate said molded articles from said heating plate.

2. The method according to claim 1 wherein said moving means collides against said holding means at a speed higher than 300 mm/sec. so as to percussively move said holding mechanism.

3. The method according to claim 1 wherein moving speed of said molded articles is decreased when they are urged against said heating plate.

4. In apparatus for fusing together thermoplastic synthetic resin molded articles of the type comprising a pair of opposing press boards, a pair of holding means provided on opposing sides of said press boards for respectively holding said molded articles, a heating plate, drive means for advancing and retracting said heating plate into and out of a space between said holding means, and moving means for urging against and separating said molded articles away from said heating plate, the improvement wherein each of said holding means comprises a floating plate mounted on each said press board to be movable in the direction of movement thereof, and a holding member for securing said molded article to said floating plate and there is provided spacer means mounted between said floating plate and said heating plate for maintaining a predetermined distance between said floating plates and said heating plate when opposing surfaces of said molded articles are urged against said heating plate to melt said opposing surfaces, said improvement further comprising means for supporting each said floating plate on each said press board such that each said floating plate can separate from each said press board so as to form a gap, said means for supporting including means for limiting said gap such that a percussive force is supplied to said holding means by movements of said moving means so as to quickly separate said molded articles from said heating plate.

5. The apparatus according to claim 4 wherein said spacer means comprises a pair of spacer members respectively secured to said floating plates at opposing positions so as to engage each other to define said distance.

6. The apparatus according to claim 5 wherein abutting ends of said pair of spacer members are provided with complemental stepped portions.

7. The apparatus according to claim 4 which further comprises spring means for biasing said floating plates to move toward said heating plate.

8. The apparatus according to claim 4 wherein each holding means comprises a mold frame having an opening into which said molded article is force fitted.

9. The apparatus according to claim 4 wherein each holding means is divided into a plurality of sections disposed along a periphery of said molded article.

10. The apparatus according to claim 8 wherein said mold frame is provided with an anchor which is projected inwardly from said mold frame to secure a peripheral portion of said molded article.

11. The apparatus according to claim 4 wherein each holding means comprises an anchor inserted through an opening of said molded article for securely holding the same.

12. The apparatus according to claim 11 wherein said anchor takes the form of a letter T, a leg portion of said T being inserted into said opening of said molded article, said anchor being rotated to secure said molded article by a top member of said T.

13. The apparatus according to claim 4 wherein each press board and each floating plate are spaced 0.5-2.5 cm at a maximum.

14. The apparatus according to claim 4 wherein said means for supporting comprise a vertical cylinder mounted on each press board, a spring biased supporting pin contained in said cylinder, a supporting member connected between one end of said supporting pin and said floating plate, and connecting pins located on both sides of said vertical cylinder, one of the ends of said connecting pins extending through said press board while the other of the ends being resiliently connected to said supporting member.

* * * * *